US007925086B2

(12) United States Patent
Zhou et al.

(10) Patent No.: US 7,925,086 B2
(45) Date of Patent: Apr. 12, 2011

(54) METHOD AND SYSTEM FOR ADAPTIVE QUANTIZATION LAYER REDUCTION IN IMAGE PROCESSING APPLICATIONS

(75) Inventors: Zhi Zhou, Corona, CA (US); Yeong-Taeg Kim, Irvine, CA (US)

(73) Assignee: Samsung Electronics Co, Ltd., Suwon (KR)

( * ) Notice: Subject to any disclaimer, the term of this patent is extended or adjusted under 35 U.S.C. 154(b) by 1120 days.

(21) Appl. No.: 11/655,321

(22) Filed: Jan. 18, 2007

(65) Prior Publication Data
US 2008/0175474 A1 Jul. 24, 2008

(51) Int. Cl.
*G06K 9/34* (2006.01)
(52) U.S. Cl. .......................... 382/173; 382/264; 382/275
(58) Field of Classification Search .................. 382/173, 382/251, 264; 375/240.2
See application file for complete search history.

(56) References Cited

U.S. PATENT DOCUMENTS

| | | | |
|---|---|---|---|
| 5,218,649 A * | 6/1993 | Kundu et al. ................ 382/180 |
| 5,598,482 A * | 1/1997 | Balasubramanian et al. 382/199 |
| 5,801,657 A | 9/1998 | Fowler et al. |
| 5,802,218 A | 9/1998 | Brailean |
| 6,668,097 B1 | 12/2003 | Hu et al. |
| 6,724,942 B1 | 4/2004 | Arai |
| 6,862,372 B2 | 3/2005 | Yang et al. |
| 6,983,078 B2 | 1/2006 | Baggs |
| 7,003,174 B2 | 2/2006 | Kryukov et al. |
| 7,148,831 B2 | 12/2006 | Krymski |
| 7,203,234 B1 | 4/2007 | Zeng |
| 7,218,418 B2 | 5/2007 | Curry et al. |
| 7,420,570 B2 | 9/2008 | Xu et al. |
| 7,541,963 B2 | 6/2009 | Krymski |
| 7,551,795 B2 | 6/2009 | Xu et al. |
| 2003/0179945 A1 | 9/2003 | Akahori |
| 2006/0104535 A1 | 5/2006 | Varekamp |
| 2008/0118170 A1 | 5/2008 | Zhou et al. |

OTHER PUBLICATIONS

Floyd, R.W. et al., "An Adaptive Algorithm for Spatial Greyscale," Proceeding of the Society for Information Display, vol. 17, No. 2, 1976, pp. 75-77, United States.
Ulichney, R.A., "Dithering with Blue Noise," Proceedings of IEEE, vol. 76, No. 1, Jan. 1988, pp. 56-79, United States.
U.S. Non-final Office Action for U.S. Appl. No. 11/603,466 mailed Mar. 9, 2010.
U.S. Notice of Allowance for U.S. Appl. No. 11/603,466 mailed Jun. 24, 2010.
U.S. Non-final Office Action for U.S. Appl. No. 11/264,973 mailed May 13, 2008.
U.S. Final Office Action for U.S. Appl. No. 11/264,973 mailed Dec. 3, 2008.
U.S. Notice of Allowance for U.S. Appl. No. 11/264,973 mailed Feb. 20, 2009.

* cited by examiner

*Primary Examiner* — Samir A Ahmed
*Assistant Examiner* — Ruiping Li
(74) *Attorney, Agent, or Firm* — Kenneth L. Sherman, Esq.; Michael Zarrabian, Esq.; Myers Andras Sherman & Zarrabian LLP

(57) ABSTRACT

A method and a system for adaptively (dynamically) reducing quantization layer reduction for removing quantization artifacts in quantized video signals is provided. Adaptively reducing quantization layer reduction involves detecting if a selected pixel in a quantized image belongs to a ramp area in each of multiple pre-defined directions, dynamically selecting a quantization level for each of the pre-defined directions based on the corresponding detection results, and refining the pixel based on the selected quantization levels.

42 Claims, 12 Drawing Sheets

Count = 3 ⟶ Non-ramp

Count = 1 ⟶ Ramp

METHOD AND SYSTEM FOR ADAPTIVE QUANTIZATION LAYER REDUCTION IN IMAGE PROCESSING APPLICATIONS

FIELD OF THE INVENTION

The present invention generally relates to video image processing, and in particular, to reducing quantization artifacts in digital video signals.

BACKGROUND OF THE INVENTION

A natural scene typically includes smoothly changing areas where the luminance is changing gradually. When the scene is recorded by a digital device such as a digital video camera, such digitization (i.e., quantization) of the luminance in a smoothly changing area may generate quantization artifacts, whereby the area no longer looks smooth to the human eye.

Quantization artifacts are perceivable by the human visual system. The magnitude of quantization artifacts is determined by the quantization accuracy in an analog-to-digital (A/D) converter of the digitization device. This magnitude is not necessarily the same as the smallest step of the digitization device, and is typically much larger, which makes the quantization artifacts more obvious to the human eye.

To eliminate such quantization artifacts, their locations in a digitized image must first be identified. Then, based on the assumption that such locations belong to originally smoothly changing areas, a smoothing operation is performed on the quantization artifacts. In general, within a largely slowly changing region the quantization artifacts resemble steps, however identifying them in a digitized image is a difficult task as it must be determined whether the artifacts are caused by the quantization of smoothly changing areas or are part of the original scene.

Such identification becomes more complicated in the presence of additive noise, which is introduced by the digitization (e.g., recording) device. Such noise makes areas containing quantization artifacts look like small detailed regions in the original scene. Conventionally, when a noisy area is identified as an area containing quantization artifacts, then a smoothing process is applied to reduce the noise, as well as the image quantization layer (or the bit-plane).

Further, a smoothly changing area may look stage-like even when the luminance of neighboring pixels is only changing by the smallest possible step. In this case, a higher precision content of the smoothly changing area is desired in order to eliminate the quantization artifacts. With the higher precision content, halftoning techniques such as error diffusion or spatial dithering can be used to quantize the higher precision content to the current bit depth. The quantization artifacts will no longer be perceivable on the halftoned image due to the spatial averaging characteristics of the human visual system. There is, therefore, a need for a method and a system for reducing the quantization layer in a quantized image.

BRIEF SUMMARY OF THE INVENTION

The present invention provides a method and a system for reducing the quantization layer in a quantized image. In one aspect, a method of reducing the quantization layer involves adaptive quantization layer reduction for removing quantization artifacts in quantized video signals. Adaptive quantization layer reduction includes detecting if a selected pixel in an image area belongs to a ramp area in a certain direction in each of the multiple pre-defined directions in the image area. Based on such ramp detection, a quantization level is dynamically selected for each pre-defined direction.

A pre-segmentation operation is performed in the image area to obtain an approximate smoothly changing area (pre-segmentation area). Then the pre-segmentation area is refined in each pre-defined direction by a segmentation operation to obtain a refined segmented area including the selected pixel. A low-pass filter is applied on the refined segmented area to obtain a version with a higher precision luminance. The image version with the higher precision luminance is mixed with the original quantized image according to a gain value to obtain an output image with reduced quantization artifacts, due to less obvious quantization layers.

The gain value is calculated based on the quantization levels from the multiple pre-defined directions, and the luminance value measurements from the refined segmented area.

In another aspect, the present invention provides a system for adaptive quantization layer reduction for removing quantization artifacts in quantized video signals, which system implements the above steps.

These and other features, aspects and advantages of the present invention will become understood with reference to the following description, appended claims and accompanying figures.

DETAILED DESCRIPTION OF THE INVENTION

The present invention provides a method and a system for adaptive quantization layer reduction, which allows reduction of quantization artifacts in a quantized (digital) image. This involves detecting if each selected pixel in a quantized image area belongs to a ramp area in each of the multiple pre-defined directions. Based on such ramp detection, a quantization level is adaptively (dynamically) selected for each of the pre-defined directions.

A higher precision version of the input image is also generated, and the quantization levels for the multiple pre-defined directions, along with luminance measurements in a directionally segmented image segment including a selected pixel, are used for gain control in mixing the input quantized image with the higher precision version, to obtain an output image with reduced quantization artifacts. The output image has a higher precision luminance then the input image, but essentially without over-smoothing.

Figure 1:
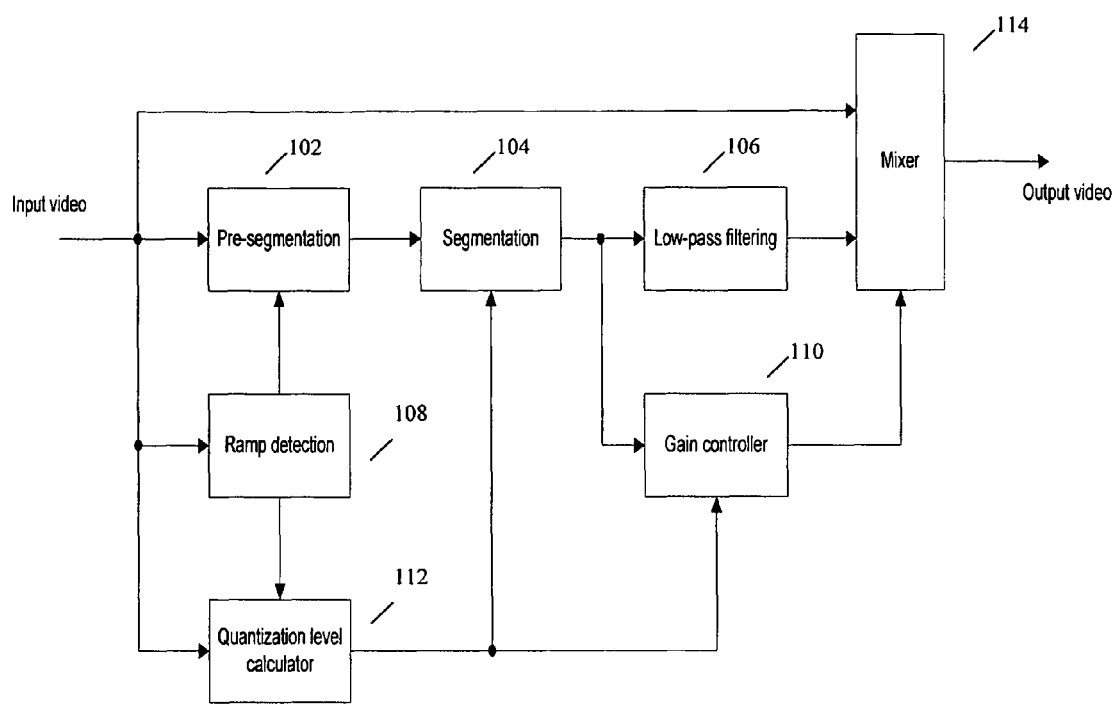
FIG. 1 shows an example of a functional block diagram of an embodiment of an adaptive quantization layer reduction system that implements a quantization layer reduction method, according to an embodiment of the present invention.

FIG. 1 shows a functional block diagram of an example image processing system 100 which implements a quantization layer reduction process, according to an embodiment of the present invention. The system 100 comprises a pre-segmentation module 102, a segmentation module 104, a low-pass filtering module 106, a ramp detection module 108, a gain controller module 110, a quantization level calculator module 112, and a mixer module 114.

The ramp detection module 108 detects whether a pixel of interest in a quantized input image belongs to a ramp area in each of the multiple pre-defined directions. The ramp detection module 108 also detects the ramp direction for the pixel of interest, such that quantization layer reduction can be applied along the detected ramp direction.

The quantization level calculator module 112 calculates the quantization level in each pre-defined direction. The pre-segmentation module 102 extracts pre-segmented areas comprising an approximate smoothly changing area, in each pre-defined direction for further segmentation. The segmentation module 104 refines the pre-segmented area in each pre-defined direction based on the corresponding quantization level calculated by the quantization level calculator module 112, to obtain a segmented area comprising a smoothly changing area. As such, the pre-segmentation module 102 and the segmentation module 104 together provide a directional segmentation function which extracts the pixel luminance values along the detected ramp direction, and segment out a smoothly changing area.

The low-pass filtering module 106 then applies filtering to the segmented area to obtain a higher precision luminance for the pixel of interest in the segmented area. The gain controller 110 measures certain conditions to obtain an overall gain value. Based on the overall gain value, the mixer 114 mixes the filtered luminance value of the pixel of interest from the filter module 106, with the original luminance value of the pixel of interest in the input video, to generate an output signal. This avoids over-smoothing. As such, the output video pixel luminance from the mixer 114 has a precision higher than the input luminance value, with reduced quantization artifacts and essentially without over-smoothing.

Figure 2:
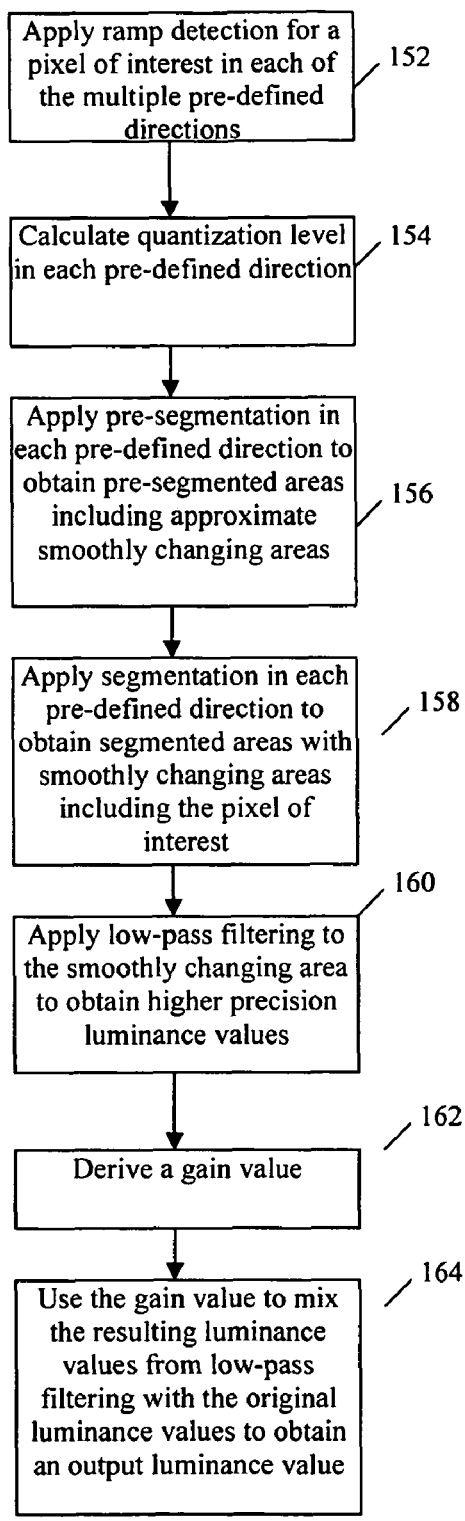
FIG. 2 shows a flowchart of a process for adaptive quantization layer reduction, according to an embodiment of the present invention.

FIG. 2 shows a flowchart of an example process 150 for adaptive quantization layer reduction, including the steps of: applying ramp detection for a pixel of interest in each of the multiple pre-defined directions to determine a ramp direction for the pixel of interest (step 152); calculating the quantization level in each pre-defined direction (step 154); applying a pre-segmentation process in each pre-defined direction to obtain pre-segmented areas with approximate smoothly changing areas (step 156); applying segmentation to the pre-segmented areas in each pre-defined direction to obtain a segmented (refined) area comprising a smoothly changing area including the pixel of interest (step 158); applying low-pass filtering to the smoothly changing area to obtain a higher precision value (step 160); deriving a gain value (step 162); and using the gain value to mix the resulting luminance values from low-pass filtering with the original luminance values to obtain an output luminance value with a precision value higher than the input luminance value but without over-smoothing (step 164).

Figure 3:
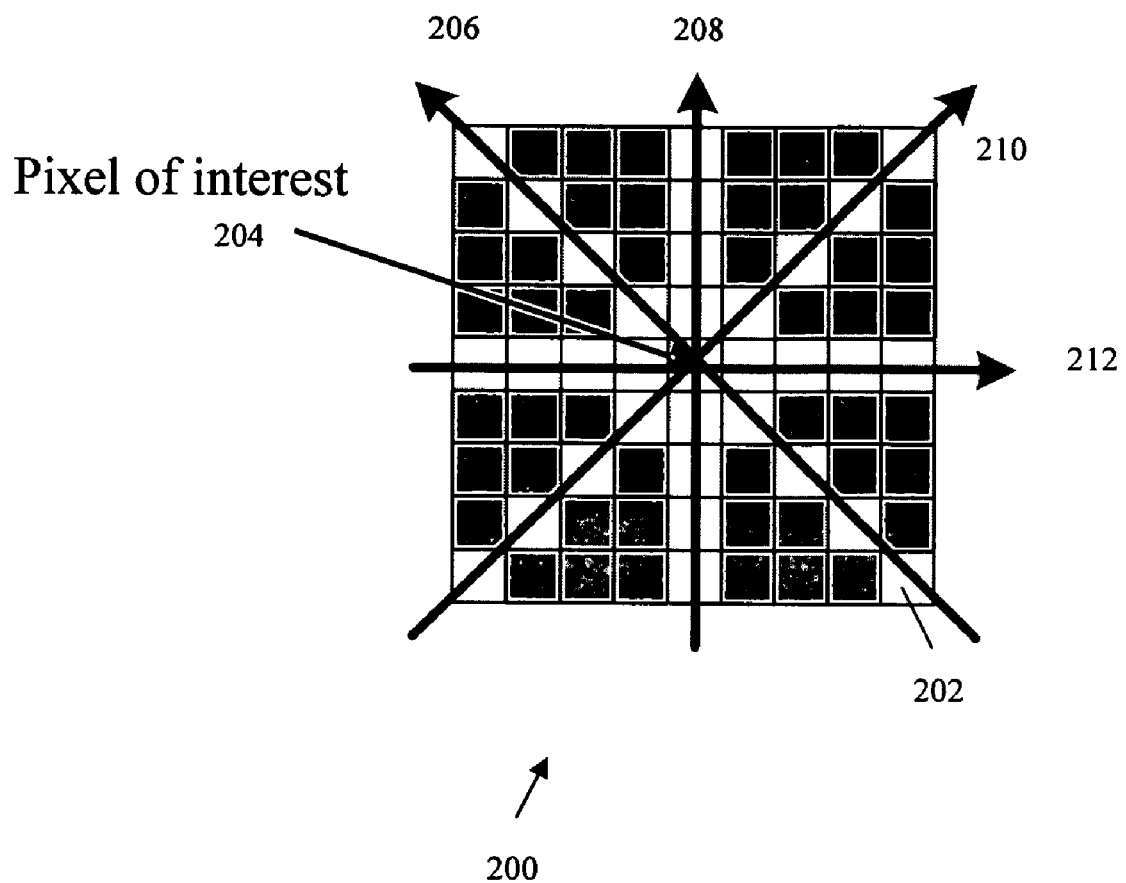
FIG. 3 shows a diagrammatical example of an application of a quantization layer reduction, including ramp direction detection, to a set of digitized image pixels in the multiple pre-defined directions, according to an embodiment of the present invention.

FIG. 3 shows an example quantized image area (window) 200 of pixels 202. An example operation of the system 100 (FIG. 1) implementing the quantization layer reduction process 150 (FIG. 2) in each of the multiple pre-defined directions 206-212 centered at a pixel of interest 204 in FIG. 3, is now described.

Ramp Detection and Quantization Level Calculation

The quantization layer often occurs in ramp areas in the digitized image. The ramp detector module 108 detects whether the pixel of interest 204 belongs to a ramp area in each of the pre-defined directions 206-212. Quantization layer reduction is applied in each direction over the pixel of interest 204, which is applied to the pixels 202 in that direction within the local window 200. Based on the ramp detection results, the quantization level calculation module 112 estimates a quantization level q from the pixels 202 in each pre-defined direction.

An example of detecting whether the pixel of interest 204 belongs to a ramp area along the pre-defined direction 206 is described below. Similar steps are then applied for detecting whether the pixel of interest 204 belongs to a ramp area along each of the remaining pre-defined directions 208-212.

For the pre-defined direction 206, the pre-segmentation module 102 applies pre-segmentation to the pixels 202 in the direction 206 to obtain a pre-segmented area including the pixel of interest 204. Then, the segmentation module 104 refines the pre-segmented area to obtain a refined segment area including the pixel of interest 204, based on the quantization level q. If the pixel of interest 204 belongs to a ramp area in the direction 206, a higher quantization level q is used in the corresponding direction by the segmentation module 104 to segment a larger smoothly changing area in the image 200; otherwise, a smaller quantization level is used. The low-pass filter 106 then filters the refined segment area to obtain a higher precision luminance value for the pixel of interest 204. The gain controller 110 performs several luminance value measurements on the refined segment area to generate an overall gain. Based on the overall gain, the mixer 114 mixes the higher precision luminance value from the low-pass filter with the original luminance of the pixel of interest 204 to obtain an output luminance value. This provides an output video image with reduced quantization layer and less perceivable quantization artifacts.

The ramp detection module 108 determines if the pixel of interest (P) 204 belongs to a ramp area in the direction 206 by comparing the luminance of the pixels in direction 206 to a threshold th. To cancel out the effect of noise, in one example the threshold th is determined by the luminance values of the pixels 202 in the direction 206. In another example, the threshold th is determined by averaging the maximum and the minimum luminance values of the pixel values in the direction 206. As those skilled in the art will recognize, other example of calculating the threshold th can be utilized.

Then, certain events which indicate if two neighboring pixels in the direction 206 are located above or below the threshold th are counted. The pixels with a luminance value equal to the threshold th are temporally removed during the counting. A ramp is detected if the total count is less or equal to one, which indicates that the pixel of interest belongs to a ramp area. Otherwise, the pixel of interest does not belong to a ramp area. The same process is also applied along the directions 208, 210 and 212.

Figure 4A:
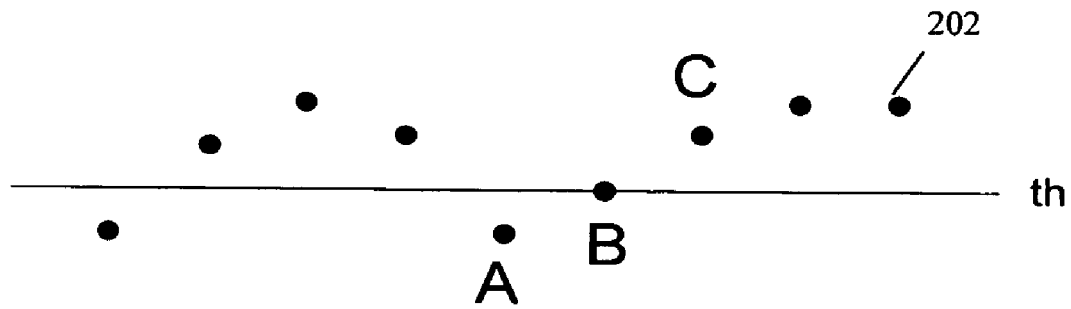
FIGS. 4A-B show examples of ramp detection in a selected pre-defined direction, according to an embodiment of the present invention.

FIG. 4A shows an example set of pixels 202 including neighboring pixels A, B and C, along the direction 206. The luminance of the pixel A is below the threshold th, the luminance of the pixel B is equal to the threshold th, and the luminance of the pixel C is above the threshold th. Since the luminance of the pixel C is above the threshold th and the luminance of the pixel A is below the threshold th, one event is counted. Using the same process, two more events are counted for the remaining pixels in FIG. 3A, bringing the total count for FIG. 3A to three. Since the total count for the pixels in FIG. 3A is greater than one, this indicates that the pixel of interest among the pixels 202 is in a non-ramp area. In this example, the segmentation module 104 uses a smaller quantization level to segment the image area 200.

Figure 4B:
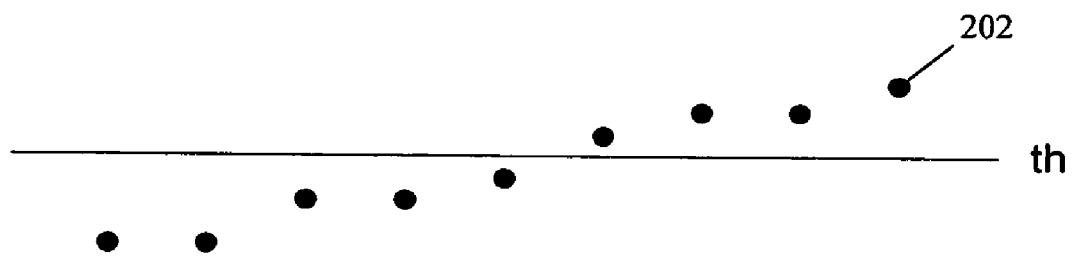

FIG. 4B shows another example set of pixels 202 including the pixel of interest. By applying the above counting process to the example in FIG. 3B, the total count results in one event for all of the pixels in FIG. 3B. This indicates the existence of a ramp area and that the pixel of interest does belong to the ramp area. In this example, the segmentation module 104 uses a higher quantization level to segment a larger smoothly changing area in the image area 200.

As discussed, ramp detection in each pre-defined direction (directions 206-212) determines if the pixel of interest 204 either belongs to a ramp area or does not belong in that direction. If the pixel of interest 204 is in a non-ramp area, then the pixel of interest 204 in the digitized image may contain information for actual small details in the original scene as opposed to quantization artifacts. Therefore, in that case, it is preferable to keep the original pixel value for the pixel of interest 204 without filtering, in order to conserve the original scene information for the small details. If the pixel of interest 204 is in a ramp area, then the quantization level is selected to be large enough to cover the entire smoothly changing area for better filtering result.

Thus, the quantization level in each pre-defined direction is associated with the steepness of the ramp in each corresponding direction. The quantization levels are used for gain computation in the gain controller 110.

If the pixel of interest 204 is in a ramp area along the direction 206, then the quantization level q is selected to be large enough (i.e., max_quant) to cover an entire smoothly changing area in the image area 200. Thereafter, filtering is applied to the smoothly changing area. As such, when the pixel of interest 204 belongs to a non-ramp area in a pre-defined direction, the quantization level calculation module 112 selects the smallest quantization level (q_min) as the quantization level q.

Figure 5:
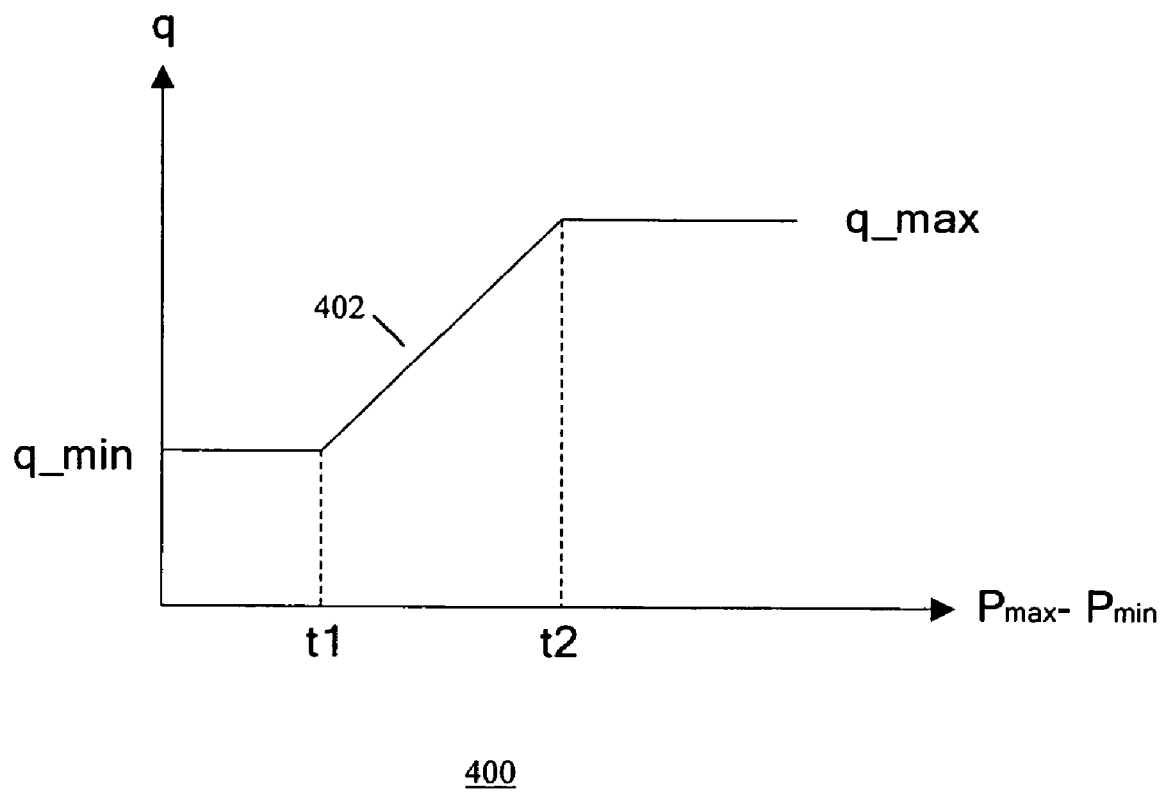
FIG. 5 shows an example of computing the quantization level of a ramp area, according to an embodiment of the present invention.

FIG. 5 shows an example 400 of selecting quantization level q for ramp areas represented by the example graph 402. For ramp areas, the quantization level is determined by the absolute difference of the maximum luminance $P_{max}$ and the minimum luminance $P_{min}$ in that direction. If the difference is smaller than a pre-defined threshold t1, the quantization level is set to a pre-defined value q_min; if the difference is greater than a pre-defined threshold t2, the quantization level is set to a pre-defined value q_max; otherwise, the quantization level is set to a linearly interpolated value between t1 and t2 based on the position of the difference between the two thresholds t1 and t2.

Accordingly, the quantization level in each pre-defined direction is calculated. In the example of FIG. 3, totally, 4 quantization levels q1, q2, q3 and q4 are calculated for directions 206, 208, 210 and 212, respectively. The quantization levels are used for gain computation in the gain controller 110. An example is described in relation to FIG. 8 further below.

Pre-Segmentation

To detect the actual smoothly changing area, using the pre-segmentation module 102, a pre-segmentation process is applied in each of the pre-defined directions to roughly approximate such actual smoothly changing area, which area is further refined in the segmentation module 104. In one example, in each of the pre-defined directions 206-212, the pixel of interest P (204) is first included in the pre-segmented area. Then, on both the left and the right side of the pixel of interest P (204), the pre-segmentation process extends the pre-segmented area from close to far, until two neighboring pixels are located above and below a threshold th, respectively. For non-ramp areas, the threshold th can be obtained using the same method as in ramp detection such as calculating the average luminance value of the pixels in that direction. For ramp areas, the threshold th is set to be the luminance value of the pixel of interest P (204). Same as in ramp detection above, the pixels with luminance value equal to the threshold th during the pre-segment, are temporally removed.

Figure 6A:
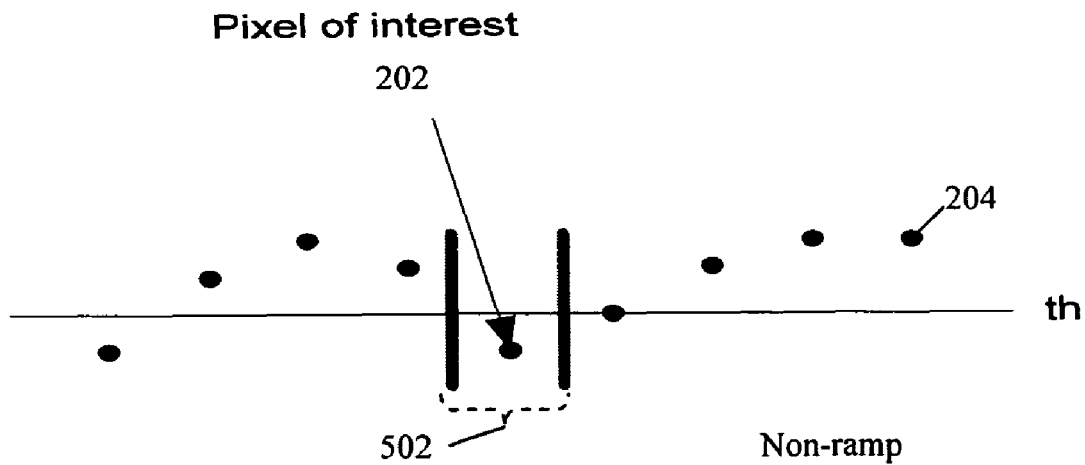
FIGS. 6A-B show examples of selecting thresholds based on pixel location in non-ramp and ramp areas, respectively, for detecting smoothly changing areas, according to an embodiment of the present invention.

As shown in the example of FIG. 6A, if the pixels 202 in a pre-defined direction 206 (FIG. 3) are detected as being in a non-ramp area, and only the pixel of interest 204, itself, is in a pre-segmented area 502. For non-ramp areas, the threshold th is obtained using the same method as in ramp detection, and only the pixel of interest 204 itself is detected as the pre-segmented area.

Figure 6B:
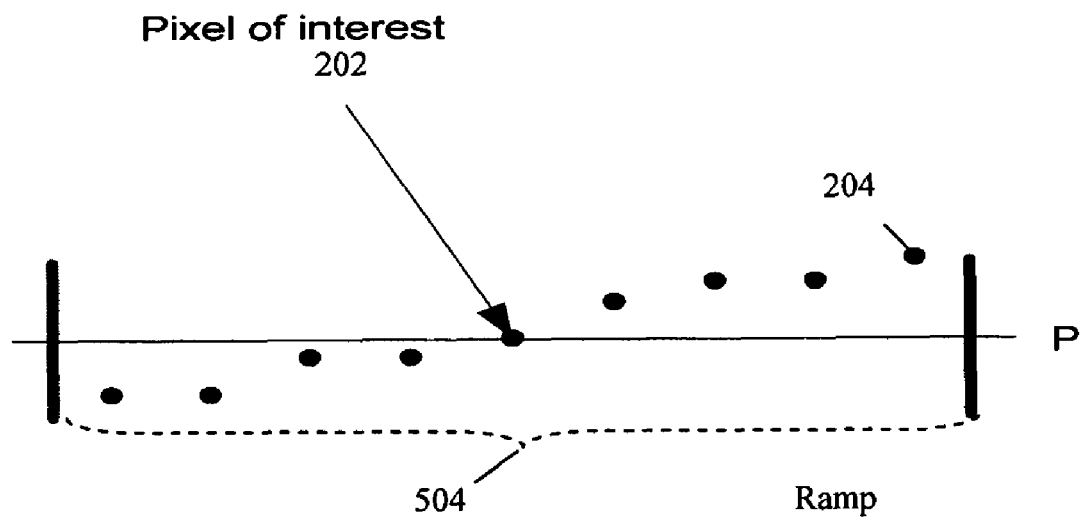

As shown in the example of FIG. 6B, if the pixels 202 in the pre-defined direction 206 (FIG. 3) are detected to be in a ramp area, then the luminance value P of the pixel of interest 204 is used as the threshold th, and the pixels of the whole row in the direction 206 are detected as the pre-segmented area 504.

After applying the pre-segmentation process in all the pre-defined directions, the pre-segmented data in the pre-segmented areas provides an approximate smoothly changing area. Generally, the pre-segmented data can exclude some small details, thus, the pre-segmentation can reduce the chance of smoothing out the small details.

Segmentation

Segmentation is then applied to the pre-segmented areas (e.g., area 502 in FIG. 6A, area 504 in FIG. 6B). In one example, in each pre-defined direction 206-212 (FIG. 3), on each side the center pixel (i.e., the pixel of interest P (204)), the segmentation module 104 computes the luminance difference of neighboring pixels one by one, from close to far, to determine if the luminance difference is larger than the quantization level in that direction in the approximate smoothly changing area. If so, the segmentation process in that direction is stopped and the pixels before the stop point are included in the resulting segment, whereby a refined segment is obtained which contains the pixel of interest 204.

After applying the segmentation in all of the pre-defined directions, the refined segment forms a smoothly changing area. The low-pass filtering module 106 performs low-pass filtering on the refined segment to obtain a higher precision luminance value for the pixel of interest 204, based on the luminance values of the pixels in the refined segment. However, if the refined segment is not symmetric about the pixel of interest 204, the resulting luminance value for the pixel of interest 204 from a low-pass filter 106 that is designed for a symmetric segment, may be biased. To avoid the bias, the farthest pixel with respect to the pixel of interest 204 is discarded until the refined segment, centered on the pixel of interest 204, is symmetric in each pre-defined direction. Therefore, a result of segmentation by the directional segmentation unit 104 (FIG. 1), a symmetric refined segment ("symmetric segment") is obtained that is centered at the pixel of interest 204. Low-pass filtering and gain control are then applied for the symmetric segment, as described below.

Low-Pass Filtering

The symmetric segment represents a smoothly changing area and therefore can be used to compute a higher precision value of the pixel of interest. In one example, the low-pass filter 106 is applied only on the luminance values of the pixels in the symmetric segment. The filter parameters can be arbitrary. One example filter uses simple averaging of the pixels' luminance values within the symmetric segment for generating high precision pixels. As those skilled in the art will recognize, other low-pass filters can be used as well, for example, Gaussian filters with different variances.

The maximum and minimum luminance values, $Y_{max}$ and $Y_{min}$, respectively, of pixels in the symmetric segment, are also recorded to develop certain luminance value measurements for gain computation by the gain controller 110, described below.

Gain Control

The luminance value measurements are used by the gain controller 110 to derive a gain value, which gain value is used in the mixer 114 for mixing/combining the output of the filter 106 with the original input pixels. This process essentially avoids over-smoothing of the pixels. In implementation of the gain controller 110, each luminance measurement leads to a sub-gain, with ranges e.g. between 0 and 1. The overall gain OG is obtained from all of the sub-gains (e.g., by multiplying all the sub-gains together). Other ways of obtaining the overall gain OG based on the sub-gains include choosing the minimum sub-gain, etc. The overall gain OG can be spatially filtered before use by the mixer 114.

Figure 7:
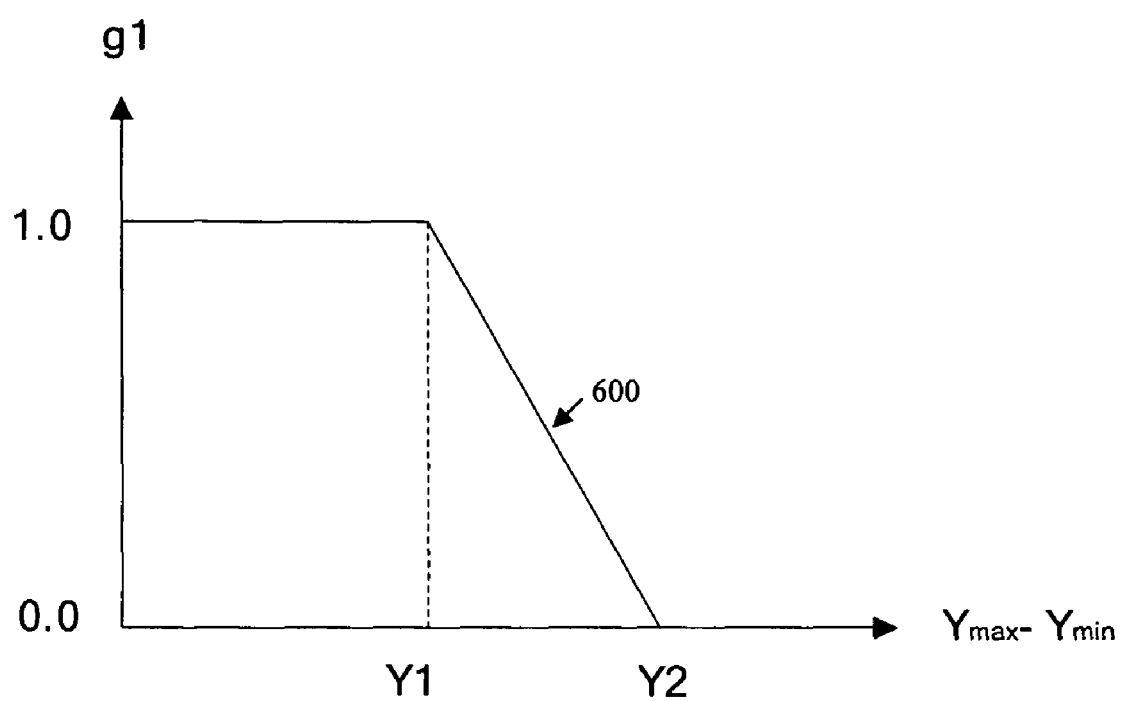
FIG. 7 shows an example of sub-gain control based on the difference between the maximum luminance value and the minimum luminance value within an image segment, according to an embodiment of the present invention.

The first luminance measurement is the difference between the maximum luminance value $Y_{max}$ and the minimum luminance value $Y_{min}$ of the pixels within the symmetric segment. This difference value is subjected to a soft-switching process shown by an example graph 600 in FIG. 7, wherein two threshold values, Y1 and Y2, are pre-defined. If the difference is smaller than the smaller threshold Y1, a sub-gain g1 is set to 1; if the difference is larger than the larger threshold Y2$_2$, the sub-gain g1 is set to 0; otherwise, the sub-gain g1 is set to a linearly interpolated value between 0 and 1 based on the position of the difference between the two thresholds Y1 and Y2.

Figure 8:
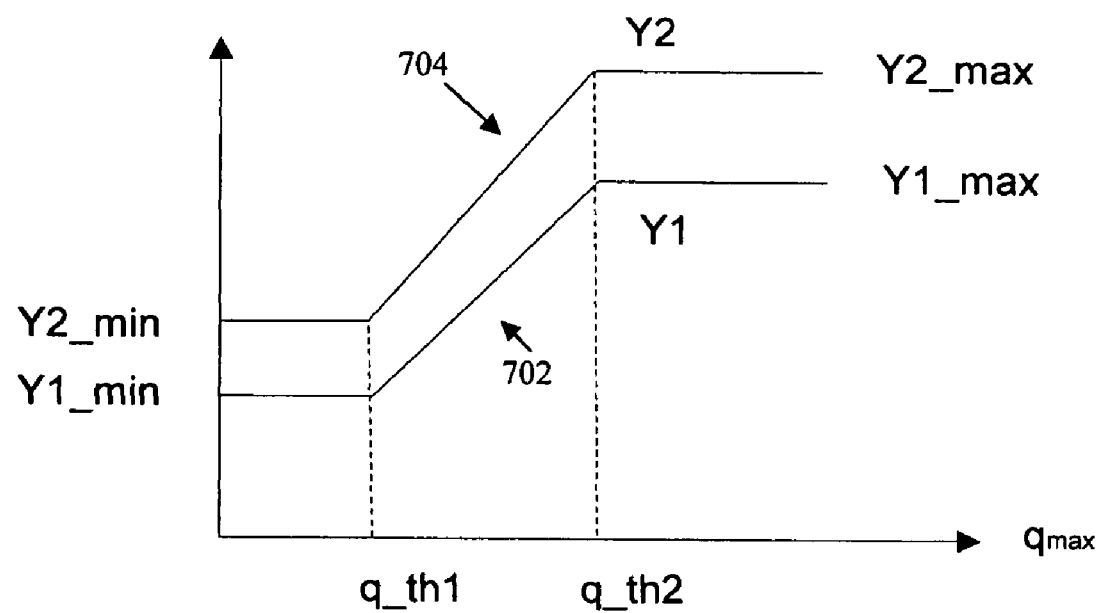
FIG. 8 shows an example of dynamically setting luminance thresholds based on the quantization levels in pre-defined directions, for gain computation according to an embodiment of the present invention.

Normally, a larger quantization level is obtained in a steeper ramp. To maintain the gain of the steeper ramp, the threshold values Y1 and Y2 can be increased. The threshold values Y1 and Y2 can be dynamically set (selected) based on the quantization levels. FIG. 8 diagrammatically shows an example process 700 for dynamically setting the thresholds Y1 and Y2 for sub-gain computation based on the quantization levels (e.g., q1, q2, q3, q4) in the pre-defined directions (e.g., 206-212). As shown in FIG. 8, if the maximum quantization level $q_{max}$ among the quantization levels for the pre-defined directions (e.g., $q_{max}$=max(q1, q2, q3, q4)) is smaller than a pre-defined threshold q_th1, the value Y1 (graph 702) is set to a pre-defined value Y1_min and the value Y2 (graph 704) is set to a pre-defined value Y2_min (wherein Y2_min≧Y1_min); if $q_{max}$ is larger than a pre-defined threshold q_th2, the value Y1 is set to a pre-defined value Y1_max and the value Y2 is set to a pre-defined value Y2_max (Y2_max>=Y1_max); otherwise, setting Y1 to a linearly interpolated value between Y1_min and Y1_max based on the position of $q_{max}$ between q_th1 and q_th2, and setting Y2 to a linearly interpolated value between Y2_min and Y2_max based on the position of $q_{max}$ between q_th1 and q_th2.

A second sub-gain value g2 is determined based on this difference value. Generally, original small details in a scene show as peak or valley luminance values in a digitized image area (e.g., area 200 in FIG. 2). To avoid smoothing out such original small details, if the luminance value of the pixel of interest 204 is very close to the minimum or the maximum luminance value within the refined symmetric segmented area, the gain (e.g., sub-gain value g2) is reduced.

Figure 9A:
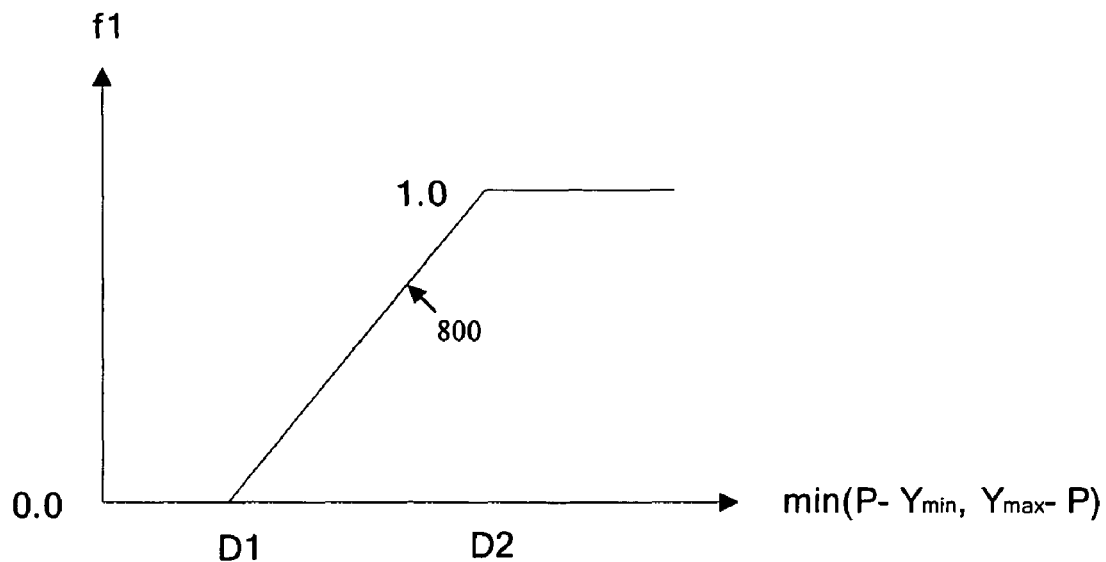
FIGS. 9A-B show examples of controlling gain values based on the difference between the luminance value of a pixel of interest and the luminance values within a symmetric segment of the digitized image, according to an embodiment of the present invention.

In one example, the sub-gain value g2 includes two gain components, f1 and f2. As shown by the example in FIG. 9A, a minimum difference value, min (P−$Y_{min}$, $Y_{max}$−P), is soft-switched to obtain the gain component f1 using the switching graph 800, wherein the threshold values D1 and D2 are pre-defined. As such, the gain component f1 is controlled by the minimum of: (1) the difference between the luminance of the pixel of interest 204 and a minimum luminance in the symmetric segment, and (2) the difference between the luminance of the pixel of interest 204 and a maximum luminance value in the symmetric segment.

According to the graph 800, if the minimum difference value, min (P−$Y_{min}$, $Y_{max}$−P), is smaller than the smaller threshold D1, then the gain component f1 is set to 0; if the minimum difference value is larger than the larger threshold D2, the gain component f1 is set to 1; otherwise, the gain component f1 is set to a linearly interpolated value between 0 and 1 based on the position of said minimum difference value between the thresholds D1 and D2.

Figure 9B:
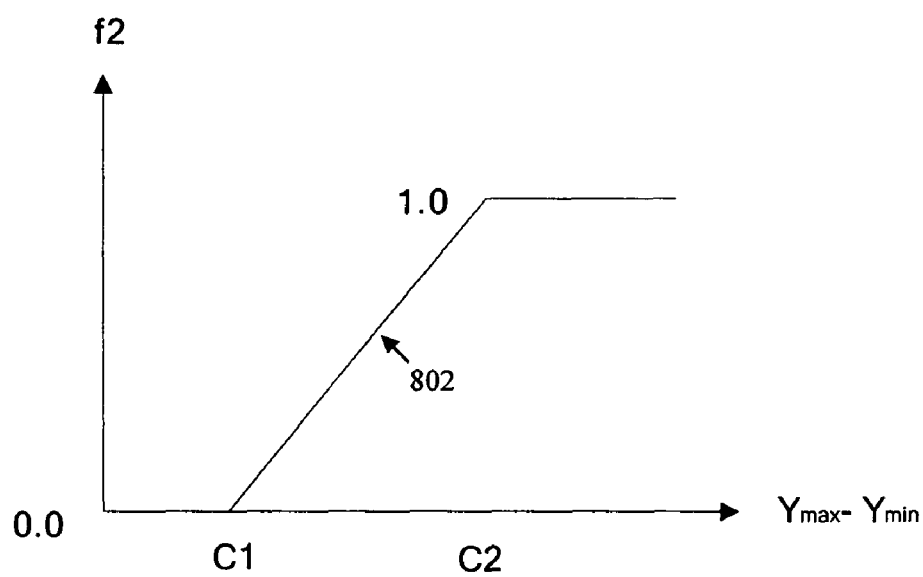

Further, as shown by the example in FIG. 9B, the possibility of the symmetric segment containing small details is checked based on the second gain component f2 according to the graph 802. As such, the gain component f2 indicates the possibility of small detail in the symmetric segment.

The gain component f2 is obtained by soft-switching the absolution difference between the maximum luminance value $Y_{max}$ and the minimum luminance value $Y_{min}$ according to the graph 802, wherein, if the absolution difference is smaller than a smaller threshold C, then the gain component f2 is set to 0; if the absolution difference is larger than the larger threshold C2, then the gain component f2 is set to 1; otherwise, the gain component f2 is set to a linearly interpolated value between 0 and 1 based on the position of the difference between the two pre-defined thresholds C1 and C2.

If the difference between the maximum luminance value $Y_{max}$ and the minimum luminance value $Y_{min}$ are below a certain threshold, it is assumed that there are no small details in the symmetric segment. In that case, the value of the gain component f1 should not affect the overall gain. Thus, the second sub-gain g2 is computed as g2=1.0−(1.0−f1)*f2.

In order to take the presence of noise into account, a third measurement used by the gain controller 110 involves determining the total number of sign changes of the neighboring differences along each pre-defined direction within the symmetric segment. A sign change is defined as an instance of minimizing or maximizing the value of the pixel luminance values along each pre-defined direction. In one example, the luminance value of each pixel in the segment is compared to a certain threshold, using the average value of the maximum and the minimum luminance as the threshold. Based on the comparison, if a pixel luminance is higher than the threshold, then a value 1 is associated with that pixel, otherwise a value 0 is associated with that pixel. As such, each pixel of the symmetric segment will either have a value 0 or a value 1 associated therewith. Then, when moving from one pixel to the next along the direction 206, a sign change is counted each time an associated pixel value goes from 0 to 1 and back to 0, or goes from 1 to 0 and back to 1, along each direction.

The number of sign changes in each pre-defined direction is counted and added as the total sign change number signchanges. For the example in FIG. 3, the number of sign changes in each of the pre-defined directions 206-212 is added up for the four sign change counts.

Figure 10:
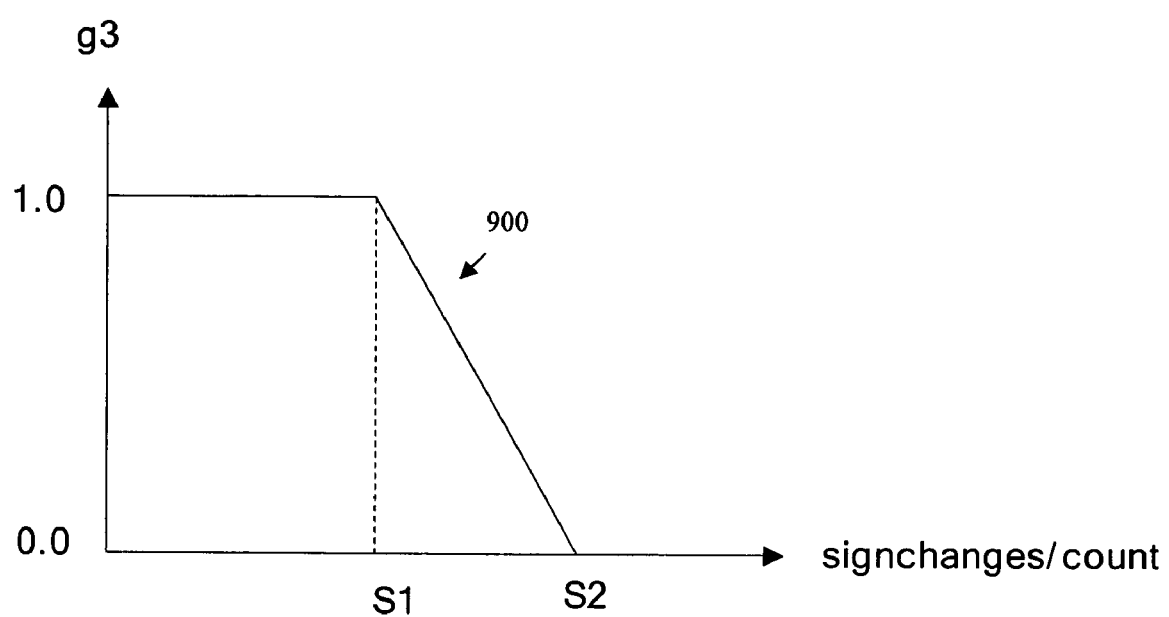
FIG. 10 shows an example of controlling a gain value based on the number of sign changes of neighboring pixel differences along pre-defined directions in a symmetric segment of the digitized image, according to an embodiment of the present invention.

The ratio of signchanges to the total number of the pixels, count, within the symmetric segment is then soft-switched to obtain a third sub-gain g3. As shown by graph 900 in FIG. 10, two thresholds S1 and S2 (wherein S1<S2) are pre-defined, wherein if the ratio is smaller than the smaller threshold S1, the sub-gain g3 is set to 1; if the ratio is larger than the larger threshold S2, the gain g3 is set to 0; otherwise, the sub-gain g3 is set to a linearly interpolated value between 0 and 1 based on the position of the ratio between the two thresholds S1 and S2.

Figure 11:
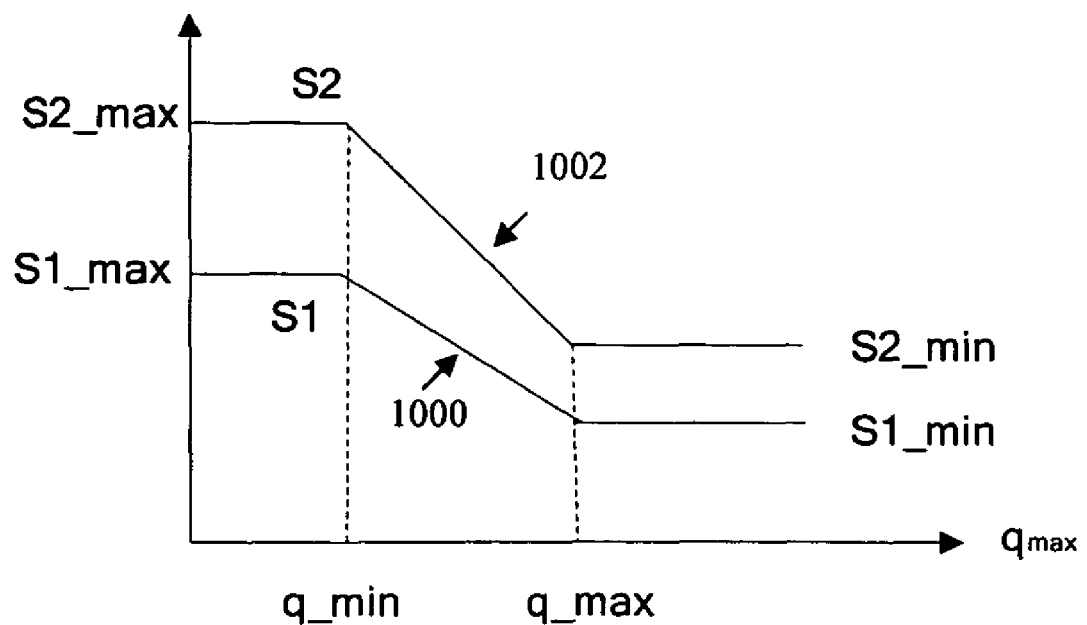
FIG. 11 shows an example of adaptively and dynamically setting thresholds based on quantization levels in pre-defined directions, for gain control according to an embodiment of the present invention.

To avoid over filtering, fewer sign changes should take place in steeper ramp areas. Thus, the threshold values S1 and S2 are dynamically selected based on the quantization levels. The thresholds S1 and S2 are adaptively set based on the quantization levels as shown by graphs 1000, 1002 in FIG. 11, such that if the maximum quantization level $q_{max}$ ($q_{max}$=max (q1, q2, q3, q4)) is smaller than a pre-defined minimum quantization level q_min, the value S1 is set to a pre-defined value S1_min, and value S2 is set to a pre-defined value S2_min; if $q_{max}$ is larger than a pre-defined maximum quantization level q_max, the value S1 is set to a pre-defined value S1_max, and the value S2 is set to a pre-defined value S2_max; otherwise, the value S1 is set to a linearly interpolated value between S1_min and S1_max based on the position of $q_{max}$ between q_min and q_max, and the value S2 is set to a linearly interpolated value between S2_min and S2_max based on the position of $q_{max}$ between q_min and q_max.

The above three sub-gain values, g1, g2 and g3, are combined (e.g., multiplied) to obtain an intermediate gain value. In one example, the intermediate gain value can be used as the overall (final) gain value by the mixer 114. In another example, the intermediate gain value is first processed in a spatial filter before being used by the mixer 114 as the overall gain value. In that case a 1×3 median filter, a 3×3 mean filter, etc., can be used. Different types of filters can be added in order to ensure a smooth transition of the output.

Mixing

Figure 12:
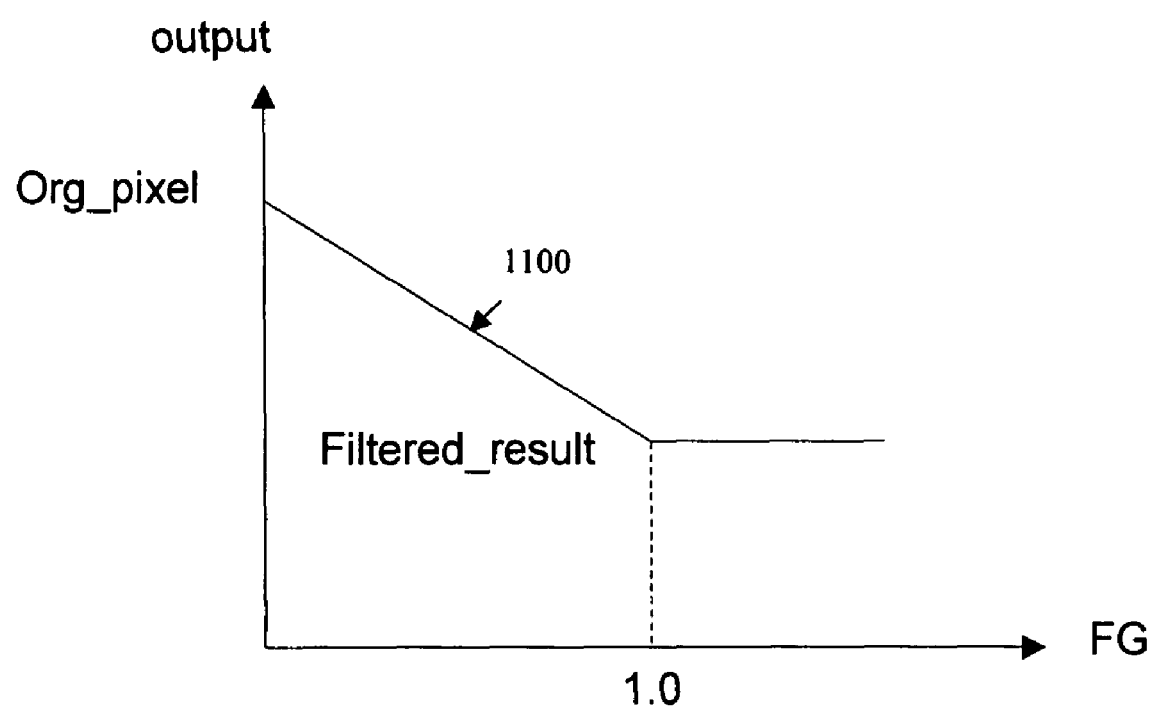
FIG. 12 shows an example of mixing by linear interpolation between the original luminance value and the filtered result based on a gain value, according to an embodiment of the present invention.

The mixer 114 uses the overall gain OG to combine the original luminance value of the pixel of interest 204 with the low-pass filtered (higher precision) luminance value of the pixel of interest 204 generated by the filtering module 106. In one example, said original and low-pass filtered luminance values are linearly interpolated by the mixer 114. FIG. 12 shows an example wherein a linear interpolation process for the original (Org_pixel) and the filtered (Filtered_result) luminance values is performed based on the overall gain OG and the graph 1100. The interpolation result is then output as a higher precision output video, with reduced quantization layers and reduced quantization artifacts, compared to the input video. Other interpolation methods, and mixing methods, can be used as well.

Output video from the mixer 114 has less/reduced quantization artifacts than input video to the system 100. The resulting luminance value from mixer 114 comprises the output video pixel having a higher precision value for removing the quantization artifacts. The above steps are repeated for each of a plurality of pixels in the image area of a quantized image.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of processing a quantized input image, comprising:
    detecting if a selected pixel in the quantized image belongs to a ramp area in each of multiple pre-defined directions by comparing luminance of pixels in the pre-defined directions to a threshold, wherein the threshold is determined based on luminance values of pixels in the pre-defined directions;
    dynamically selecting a quantization level for each of the pre-defined directions based on the corresponding detection results;
    refining the pixel based on the selected quantization levels including:
        applying a segmentation process along the ramp direction to obtain a smoothly changing area including the selected pixel; and
        refining the smoothly changing area based on the quantization levels to obtain a refined segment area;
    performing a low-pass filtering operation on the refined segment area to obtain a filtered area with higher precision pixel values;
    performing luminance value measurements in the refined segment area; and
    determining a gain value from the measured luminance values including determining a sub-gain g3 based on the neighboring pixel differences along the selected direction within the refined segment and determining the sub-gain value g3 further based on a ratio of: (a) the total sign changes of the neighboring differences along the pre-defined directions within the refined segment, and (b) the total number of the pixels within the refined segment.

2. The method of claim 1 wherein refining comprises increasing a precision of the pixel such that the refined pixel has a higher precision, and a reduced quantization layer, than the input pixel.

3. The method of claim 1 wherein dynamically selecting each quantization level further includes selecting each quantization level based on the steepness of the ramp area in a corresponding direction.

4. The method of claim 1 wherein the selected quantization level is higher for a pixel in a ramp area than for a pixel in a non-ramp area.

5. The method of claim 1 wherein selecting the quantization level in each direction further includes selecting the quantization level based on a set of pixels in that direction.

6. The method of claim 1 further comprising:
using the gain value to mix the filtered and the original luminance values of the selected pixel.

7. The method of claim 1, wherein determining a gain value further includes determining a sub-gain g1 based on a difference between a maximum luminance value $Y_{max}$ and a minimum luminance value $Y_{min}$ of the pixels within the refined segment.

8. The method of claim 1, wherein determining a gain value further includes determining a sub-gain g2 based on a difference between the luminance of the selected pixel, and either a minimum luminance $Y_{min}$ or a maximum luminance $Y_{max}$ within the refined segment.

9. The method of claim 1, wherein determining a gain value further includes:
determining a first sub-gain g1 based on a difference between a maximum luminance value $Y_{max}$ and a minimum luminance value $Y_{min}$ of the pixels within the refined segment;
determining a second sub-gain g2 based on a difference between the luminance of the selected pixel, and either a minimum luminance $Y_{min}$ or a maximum luminance $Y_{max}$ within the refined segment;
determining a third sub-gain g3 based on the neighboring pixel differences along the selected direction within the refined segment; and
determining the gain value based on a combination of two or more of the sub-gain values.

10. The method of claim 9 further comprising determining the gain value by multiplying the three sub-gains together to obtain the gain value.

11. The method of claim 10 further comprising determining the gain value by multiplying the three sub-gains together and spatially filtering the product to obtain the gain value.

12. The method of claim 8 wherein determining the sub-gain g2 further includes determining the sub-gain g2 as a function of a first gain component f1 that is based on the minimum of: (1) the difference between the luminance of the selected pixel and a minimum luminance in the refined segment, and (2) the difference between the luminance of the selected pixel and a maximum luminance value in the refined segment.

13. The method of claim 12 wherein determining the sub-gain g2 further includes determining the sub-gain g2 further as a function of a second gain component f2 that is based on the absolution difference between the maximum luminance value $Y_{max}$ and the minimum luminance value $Y_{min}$ in the refined segment.

14. The method of claim 1 wherein:
applying a segmentation process further includes:
applying pre-segmentation in each pre-defined direction to obtain an approximate smoothly changing area including the selected pixel; and
applying segmentation in each pre-defined direction to obtain a smoothly changing area including the selected pixel;
the method further includes:
performing low-pass filtering on smoothly changing area to obtain a higher precision value; and
mixing the higher precision value with the luminance of the original luminance of the selected pixel to obtain an output luminance value.

15. The method of claim 7 determining the sub-gain g1 further comprises:
comparing said difference to threshold values, Y1 and Y2, wherein Y1<Y2;
if said difference is smaller than the smaller threshold Y1, then setting sub-gain g1 to 1; and
if said difference is larger than the larger threshold Y2, then setting sub-gain g1 to 0;
otherwise, setting sub-gain g1 to a linearly interpolated value between 0 and 1 based on the position of the difference between the two thresholds Y1 and Y2.

16. The method of claim 15 further comprising selecting the threshold values Y1 and Y2 based on the quantization levels in the pre-defined directions.

17. The method of claim 16 wherein selecting the threshold values Y1 and Y2 further includes:
determining a maximum $q_{max}$ among the quantization levels;
if $q_{max}$ is smaller than a pre-defined threshold q_th1, then selecting Y1 and Y2 as pre-defined values Y1_min and Y2_min (Y2_min≧Y1_min), respectively, wherein Y2_min≧Y1_min; and
if $q_{max}$ is larger than a pre-defined threshold q_th2, then selecting Y1 and Y2 as pre-defined values Y1_max and Y2_max, respectively, wherein Y2_max≧Y1_max;
otherwise, setting Y1 to a linearly interpolated value between Y1_min and Y1_max based on the position of $q_{max}$ between q_th1 and q_th2, and setting Y2 to a linearly interpolated value between Y2_min and Y2_max based on the position of $q_{max}$ between q_th1 and q_th2.

18. The method of claim further comprising:
comparing said ratio to threshold values, S1 and S2, wherein S1<S2;
if the ratio is smaller than the smaller threshold S1, then setting sub-gain g3 to 1; and
if the ratio is larger than the larger threshold S2, then setting sub-gain g3 to 0;
otherwise, setting the sub-gain g3 to a linearly interpolated value between 0 and 1 based on the position of the ratio between the two thresholds S1 and S2.

19. The method of claim 18 further comprising dynamically selecting the threshold values S1 and S2 based on the quantization levels.

20. An image processing system for processing a quantized input image, comprising: a hardware processor coupled with
a detector that is configured for detecting if a selected pixel in the quantized image belongs to a ramp area in each of multiple pre-defined directions;
a quantization level calculator that is configured for dynamically calculating a quantization level for each of the pre-defined directions based on the corresponding detection results; and
a refining module that is configured for refining the pixel based on the selected quantization levels, wherein the refining module comprises:
a pre-segmenter that is configured for applying a segmentation process along the ramp direction to obtain a smoothly changing area including the selected pixel;
a segmenter that is configured for refining the smoothly changing area based on the quantization levels to obtain a refined segment area;
a low-pass filter that is configured for performing a low-pass filtering operation on the refined segment area to obtain a filtered area with higher precision pixel values; and
a gain controller that is configured for obtaining luminance value measurements in the refined segment area, and for determining a gain value from the measured luminance values, wherein the gain controller is further configured to determine a sub-gain g3 based on the neighboring pixel differences along the selected direction within the refined segment, wherein the gain controller is further configured to determine the sub-gain g3 based on a ratio of: (a) the total sign changes of the neighboring differences along the pre-defined directions within the refined segment, and (b) the total number of the pixels within the refined segment.

21. The system of claim 20 wherein the refined pixel has a higher precision, and a reduced quantization layer, than the input pixel.

22. The system of claim 20 wherein the quantization level calculator is configured to calculate each quantization level based on the steepness of the ramp area in a corresponding direction.

23. The system of claim 20 wherein the calculated quantization level is higher for a pixel in a ramp area than for a pixel in a non-ramp area.

24. The system of claim 20 wherein the quantization level calculator is configured to calculate the quantization level based on a set of pixels in that direction.

25. The system of claim 20, wherein the refining module comprises:
a pre-segmenter that is configured to apply a segmentation process along the ramp direction to obtain a smoothly changing area including the selected pixel; and
a segmenter that is configured to refine the smoothly changing area based on the quantization levels to obtain a refined segment area.

26. The system of claim 25 further comprising a low-pass filter that is configured to perform a low-pass filtering operation on the refined segment area to obtain a filtered area with higher precision pixel values.

27. The system of claim 26 further comprising a gain controller that is configured to obtain luminance value measurements in the refined segment area, and determine a gain value from the measured luminance values.

28. The system of claim 27 further comprising a mixer that is configured to mix the filtered and the original luminance values of the selected pixel, based on the gain value.

29. The system of claim 27, wherein the gain controller is further configured to determine a sub-gain g1 based on a difference between a maximum luminance value $Y_{max}$ and a minimum luminance value $Y_{min}$ of the pixels within the refined segment.

30. The system of claim 27, wherein the gain controller is further configured to determine a sub-gain g2 based on a difference between the luminance of the selected pixel, and either a minimum luminance $Y_{min}$ or a maximum luminance $Y_{max}$ within the refined segment.

31. The system of claim 27, wherein the gain controller is further configured to determine a sub-gain g3 based on the neighboring pixel differences along the selected direction within the refined segment.

32. The system of claim 27, wherein the gain controller is further configured to:
determine a first sub-gain g1 based on a difference between a maximum luminance value $Y_{max}$ and a minimum luminance value $Y_{min}$ of the pixels within the refined segment;
determine a second sub-gain g2 based on a difference between the luminance of the selected pixel, and either a minimum luminance $Y_{min}$ or a maximum luminance $Y_{max}$ within the refined segment;
determine a third sub-gain g3 based on the neighboring pixel differences along the selected direction within the refined segment; and
determine the gain value based on a combination of two or more of the sub-gain values.

33. The system of claim 32 wherein the gain controller is further configured to determine the gain value by multiplying the three sub-gains together to obtain the gain value.

34. The system of claim 33 wherein the gain controller is further configured to determine the gain value by multiplying the three sub-gains together and spatially filtering the product to obtain the gain value.

35. The system of claim 30 wherein the gain controller is further configured to determine the sub-gain g2 as a function of a first gain component f1 that is based on the minimum of: (1) the difference between the luminance of the selected pixel and a minimum luminance in the refined segment, and (2) the difference between the luminance of the selected pixel and a maximum luminance value in the refined segment.

36. The system of claim 35 wherein the gain controller is further configured to determine the sub-gain g2 as a function of a second gain component f2 that is based on the absolution difference between the maximum luminance value $Y_{max}$ and the minimum luminance value $Y_{min}$ in the refined segment.

37. The system of claim 29 wherein the gain controller is further configured to determine the sub-gain g1 by:
comparing said difference to threshold values, Y1 and Y2, wherein Y1<Y2, and
if said difference is smaller than the smaller threshold Y1, then setting sub-gain g1 to 1; and
if said difference is larger than the larger threshold Y2, then setting sub-gain g1 to 0;
otherwise, setting sub-gain g1 to a linearly interpolated value between 0 and 1 based on the position of the difference between the two thresholds Y1 and Y2.

38. The system of claim 37 wherein the gain controller is further configured to select the threshold values Y1 and Y2 based on the quantization levels in the pre-defined directions.

39. The system of claim 38 wherein the gain controller is further configured to select the threshold values Y1 and Y2 by:
determining a maximum $q_{max}$ among the quantization levels;
if $q_{max}$ is smaller than a pre-defined threshold q_th1, then selecting Y1 and Y2 as pre-defined values Y1_min and Y2_min (Y2_min≧Y1_min), respectively, wherein Y2_min≧Y1_min; and
if $q_{max}$ is larger than a pre-defined threshold q_th2, then selecting Y1 and Y2 as pre-defined values Y1_max and Y2_max, respectively, wherein Y2_max≧Y1_max;
otherwise, setting Y1 to a linearly interpolated value between Y1_min and Y1_max based on the position of $q_{max}$ between q_th1 and q_th2, and setting Y2 to a linearly interpolated value between Y2_min and Y2_max based on the position of $q_{max}$ between q_th1 and q_th2.

40. The system of claim 31 wherein the gain controller is further configured to determine the sub-gain g3 by:
comparing said ratio to threshold values, S1 and S2, wherein S1<S2;
if the ratio is smaller than the smaller threshold S1, then setting sub-gain g3 to 1; and
if the ratio is larger than the larger threshold S2, then setting sub-gain g3 to 0;
otherwise, setting the sub-gain g3 to a linearly interpolated value between 0 and 1 based on the position of the ratio between the two thresholds S1 and S2.

41. The system of claim 40 wherein the gain controller is further configured to dynamically select the threshold values S1 and S2 based on the quantization levels.

42. The method of claim 1, further comprising:
counting pixels with a luminance value greater than or less than the threshold, wherein pixels with a luminance value equal to the threshold are temporarily removed during counting the pixels, and a ramp is detected if a total count is less than or equal to a predetermined value.

* * * * *